(12) United States Patent
Ellison (10) Patent No.: US 8,208,637 B2
(45) Date of Patent: Jun. 26, 2012

(54) MIGRATION OF COMPUTER SECRETS

(75) Inventor: Carl M. Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 11/958,376

(22) Filed: Dec. 17, 2007

(65) Prior Publication Data
US 2009/0154709 A1 Jun. 18, 2009

(51) Int. Cl.
*H04L 9/08* (2006.01)
(52) U.S. Cl. ......................... 380/278; 713/164
(58) Field of Classification Search .................. 380/278; 713/164
See application file for complete search history.

(56) References Cited

U.S. PATENT DOCUMENTS

| | | | |
|---|---|---|---|
| 7,095,859 B2 | 8/2006 | Challener | |
| 7,143,287 B2* | 11/2006 | Bade et al. | 713/164 |
| 7,242,768 B2 | 7/2007 | Challener | |
| 7,747,024 B2* | 6/2010 | Challener | 380/278 |
| 2003/0174842 A1* | 9/2003 | Challener | 380/277 |
| 2005/0138389 A1 | 6/2005 | Catherman et al. | |
| 2005/0235141 A1 | 10/2005 | Ibrahim et al. | |
| 2006/0005000 A1 | 1/2006 | King et al. | |
| 2006/0089995 A1 | 4/2006 | Kerr et al. | |
| 2006/0161784 A1 | 7/2006 | Hunter et al. | |
| 2007/0073416 A1 | 3/2007 | Grawrock | |
| 2007/0079120 A1 | 4/2007 | Bade et al. | |
| 2007/0094719 A1 | 4/2007 | Scarlata | |

FOREIGN PATENT DOCUMENTS

| | | |
|---|---|---|
| JP | 2007-220071 A | 8/2007 |
| KR | 10-2007-0113788 A | 11/2007 |
| WO | WO 03044619 A2 * | 5/2003 |

OTHER PUBLICATIONS

International Search Report and Written Opinion Received for PCT Application No. PCT/US2008/084126, mailed on Apr. 28, 2009, 12 pages.
Berger, et al., "vTPM: Virtualizing the Trusted Platform Module", Date: Feb. 14, 2006.
Kallahalla, et al., "SoftUDC: A Software-Based Data Center for Utility Computing", Date: Nov. 2004, vol. 37, Issue 11, pp. 38-46.
Michiel Broekman, "End-To-End Application Security Using Trusted Computing", Date: Aug. 18, 2005.

* cited by examiner

*Primary Examiner* — Jacob Lipman
(74) *Attorney, Agent, or Firm* — Wolfe-SBMC (57) ABSTRACT

Described is a technology by which computer data secrets sealed by a trusted platform module (TPM) or like device may be securely migrated from a physical source computing machine to a physically different destination machine. For example, migration of TPM secrets allows migration of a virtual machine from one physical machine to another. A destination machine receives a set of data sealed at a source machine. The set of data includes a migration key and a secret sealed by the migration key. The destination machine performs attestation with a key server to attest that the destination machine is entitled to access the sealed secret, via credentials, known good configuration and/or other policy compliance. The key server unseals the migration key, and provides a returned key (e.g., the migration key or a session key) to the destination machine for unsealing the secrets.

19 Claims, 5 Drawing Sheets

MIGRATION OF COMPUTER SECRETS

BACKGROUND

In a number of computing scenarios, there are reasons for keeping information securely secret. The most typical example is that of a cryptographic key, used either for encrypting data for privacy or for digitally signing data or for computing a Message Authentication Code (MAC).

Because software solutions do not provide a particularly secure way to keep such secrets, contemporary computing devices are turning to hardware solutions to keep secrets. To this end, some modern computing machines include hardware devices such as a trusted platform module (TPM) or like device; (for purposes of simplicity herein, a TPM or TPM-like device will be referred to as a TPM-like device, regardless of whether it is an actual TPM device). A TPM-like device maintains a tamper-resistant memory of a measurement of system state, used to measure the boot process for the machine (in order to detect tampering with the machine's system code). Measurements of system state are tamper-resistant and not secret but a TPM-like device may hold or prepare secrets, by a process known as "sealing," which preserves sealed secrets for release only to future instantiations of the system that are running code that is authorized to have access to the sealed secrets where that code is identified by measurements of system state. A TPM-like device also may be able to function to an extent as a cryptographic processor, which in general is a hardware device that holds cryptographic keys and can apply them on demand, when the system it supports requests that application.

Typically, the sealing of secrets is bound to a chain of measurements and eventually to physical tamper resistance of a physical TPM-like device, so that it can enforce the typical policy of releasing such a secret only to a tamper-free version of the software that sealed the secret. Any modification of any portion of measured code changes the measurement of that code, causing the failure to match the typical access control policy for that sealed secret and the TPM-like device's refusal to release the sealed secret. This is the desired security effect when protecting against software tampering.

However, there are situations in which this security effect is not desirable. By way of example, consider the concept of virtual machines. A virtual machine is meant to act like a physical machine, but may run with other virtual machines on the same physical machine, such as for purposes of server consolidation. For various reasons, including maintenance, load balancing and so forth, it is sometimes desirable to migrate a virtual machine to a different physical machine. However, when secrets are bound by hardware to a certain physical machine, the above-described security effect prevents such virtual machine migration if the functioning of that virtual machine requires use of a sealed secret. This problem also occurs in other computing scenarios, such as exchanging secrets between nodes of clustered servers. It also occurs when needing to restore backed up secrets to a new physical computer when the original physical computer ceases to function. The TPM-like device referenced herein can be a hardware device, like a TPM, or a software functionality that performs the same functions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which secrets sealed to a TPM-like device may be securely migrated from one physical source machine to a physically different destination machine. This technology treats a sealed secret as a message from one TPM-like device to itself but at a later time (with a possibly different software environment). The security policy for release of that secret requires comparison of the measurements of the destination software environment to measurements listed in the policy included inside the sealed "message" and alongside the secret that has been sealed. The message in traditional cases is encrypted and integrity-protected by a key that is private to that one hardware TPM-like device.

There is herein provided a variant of that message, encrypted and integrity-protected using a key that belongs to a third entity, namely a service (a key server) trusted by the source. This may include a protocol whereby the destination machine provides proof of its measured software configuration (a process known as "attestation") to the key server and the key server evaluates that software configuration against the policy in the sealed "message," and decides whether to release the secret. If the policy is satisfied, the key server releases to the destination machine either the sealed secret or a session key used to encrypt the sealed secret. The latter variant is used if the secret is not to be shared with the key server, only with the destination machine.

In one aspect, performing attestation with the key server includes providing credentials and configuration data (e.g., data corresponding to measurements of code) from the destination machine. Further, additional policy data may be provided to the key server, which the key server evaluates against current state, such as state data provided by the destination machine indicative of a current state of the destination machine.

In one example implementation, the secret or set of secrets received at the destination machine corresponds to virtual TPM-like secrets. When unsealed via interaction with the key server, the secrets may be used to migrate a virtual machine from the source machine to the destination machine. That is, a virtual machine (or any other software state, such as a process) may be migrated from one environment to another in pieces, including the collection of non-secrets and the secrets used by that software. The non-secrets are copied from one environment to another. The secrets are migrated as specified herein. Only when both arrive at the destination environment and are made available to it is the software migration complete.

In one aspect, software on a source machine prepares secret data for migration by building a migration message similar to that built by a TPM-like device when it seals a secret. The migration message includes a secret and a policy expressed in terms of characteristics of a software environment (such as its TPM-like measurements) that is to be allowed access to the secret. This migration message may be kept with the software and migrate with it, if it ever migrates. In the event of migration of that software and its data, the sealed secret in the migration message is thus accessible to the destination machine. That machine presents the migration message to the key server holding the cryptographic key that can unseal the sealed migration message. The key server also receives proof from the destination machine of the software environment characteristics it needs to compare against the migration message's policy, and if that policy is satisfied, returns data to the destination machine. The key server may be incorporated into the source machine, or may be independent of the source machine. The secret revealed by the key server to the destination machine may be the actual secret or a temporary encryption key used to encrypt the actual secret (the latter option being used if the actual secret is not to be shared with the key server).

In one aspect, a key server may receive both a sealed migration message and attestation data from a destination machine. That attestation data includes measurements or other characteristics of the destination environment to allow the key server to evaluate the security policy in the migration message. The attestation data also needs to be cryptographically integrity-protected and authenticated, such as with a public-key digital signature. The authentication of the destination server itself may be attested to by a digital certificate, using well known practices, and a field or fields from that certificate may be used as part of the security policy within the migration message, so that only destination machines that were authorized would be allowed to report measurements and receive migrated secrets.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards overcoming the security effect that prevents migration of secrets kept via the use of a storage key (s-key, or $K_s$) kept embedded within the hardware of a TPM-like device. To this end, the technology facilitates migration of secrets through the use of a different storage key, referred to as a migration key, (m-key or $K_m$), which may be one provided by a key server such as an existing RMS server (Rights Management Services, a Microsoft Windows® Server product). This key can be used only during the process of migration, or can be used at all times such that any time a secret needs to be unsealed there is no need for a further communication with the server.

While examples used herein are generally directed towards migration of secrets for the purposes of migrating virtual machines, it is understood that any type of secret may be migrated. Thus, the concept of any sealed set of data, or data blob, is used herein to refer to a set of at least one secret and possibly related information (such as policy providing criteria as to which entity or entities may view the secret). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and migration of data in general.

Figure 1:
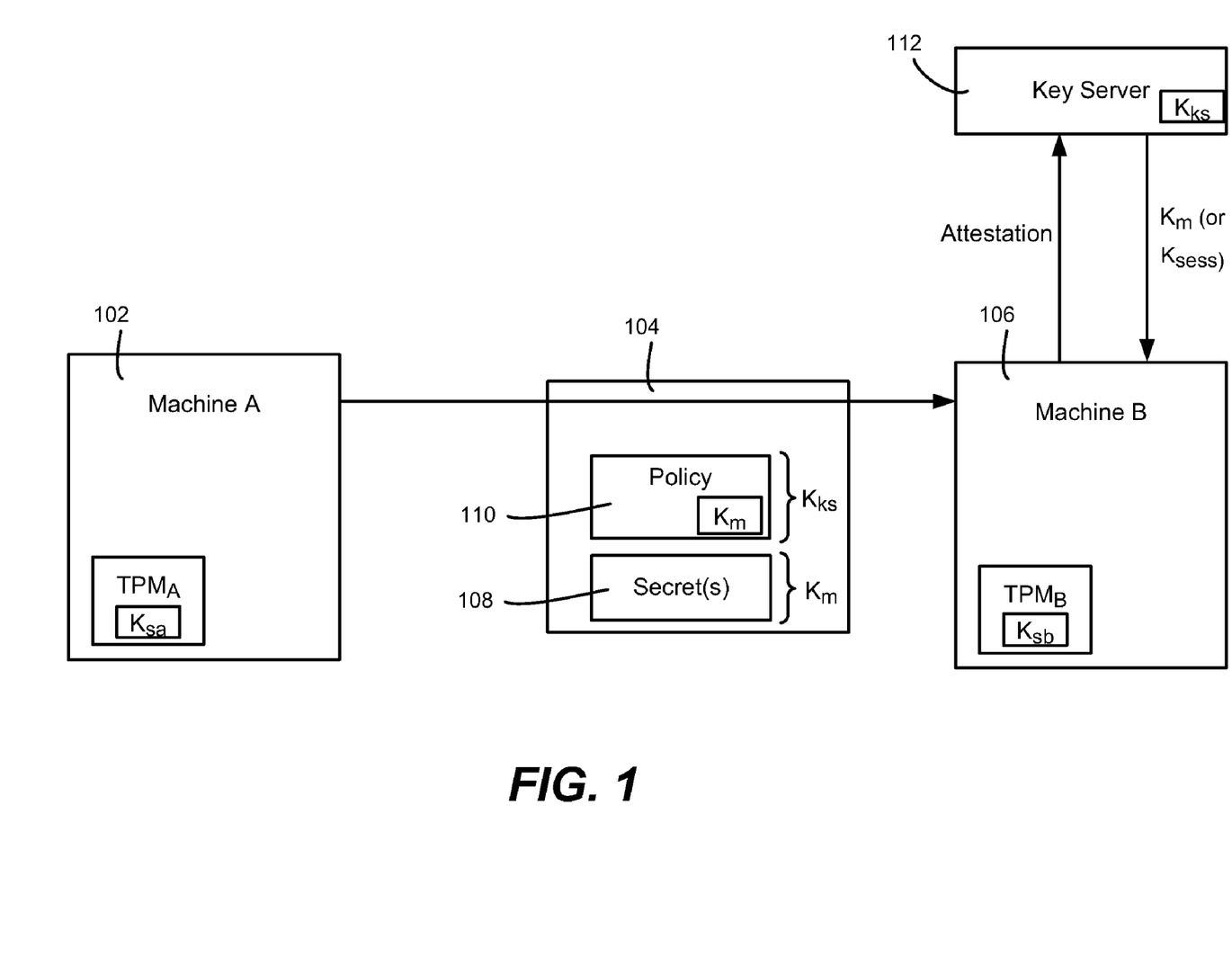
FIG. 1 is a block diagram representing an example network configuration for migrating secrets between physical machines.

Turning to FIG. 1, there is shown a machine A 102 that is attempting to migrate or preparing to migrate some set of data (a data blob) 104 to a machine B 106, the set of data 104 including a sealed secret (or set of secrets) 108. In this example, the migrated data 104 includes policy 110 as described below, integrity protected (signed) with a secret key $K_{sa}$ maintained in the machine A's TPM-like device, $TPM_A$. Part (or all) of the sealed policy includes a migration key $K_m$, itself encrypted in the encryption key of the key server, $K_{ks}$, that is used to encrypt the secrets 108.

When machine B 106 receives the data 104, the machine B 106 cannot directly unseal (decrypt) the data set 104 because it has no knowledge of $K_{ks}$. Instead, the machine B 106 communicates with a key server 112, and along with the blob also provides its credentials to the key server 112, as part of a process referred to as attestation. The key server 112 has knowledge of $K_{sa}$, to verify the integrity of the policy of this message, either directly or as part of a public key/private key relationship. It also has possession of the decryption key for $K_{ks}$.

Note that the machine A 102 need not directly send the machine B 106 the data set 104. That data set (migration message) may be left with the software state on the machine A to be migrated if it ever migrates. It can be left in some repository (such as but not limited to a key server) and only the path to it be communicated to machine B 106 or stored with the software state on the machine A 102. It can be stored in a backup medium along with other data that is part of the software state and delivered to the machine B 106 only during the course of data recovery.

With respect to attestation, the key server 112 verifies whether the machine B 106 is entitled to unseal the secrets, which in the example shown in FIG. 1 may correspond to receiving the migration key $K_m$. The machine B's credentials are evaluated, as is any configuration data that ensures that in addition to having the proper credentials, the machine B 106 has not been tampered with. For example, attestation may include register values (signed) that indicate the machine's configuration measured in the boot process and maintained in machine B's TPM-like device $TPM_B$, and/or a report log along with the register values (both signed). Note that the machine B can itself be a TPM-like device and the secret 108 can be a policy and $K_m$ similar in structure to data 110. In such a case, there may be communicated a sealed datum's unsealing policy from one TPM-like device to another so that the receiving TPM-like device can later unseal the datum according to the desired policy. Note also that the key $K_m$ may be the actual secret, in which case no encrypted secret 108 is in the migration message 104.

Further, beyond policy data stating that the machine B 106 is indeed Machine B and is otherwise in a good configuration, additional criteria set forth in the policy data 110 may need to be met. For example, the Machine B may only be able to access the set of one or more secrets 106 at a certain time of day, the machine B 106 may not be able to access the secrets 108 if it is currently running program XYZ, the machine B may need to comply with other security checks, and so forth.

If the machine B 106 is entitled to receive the migration key $K_m$, the key server 112 provides it (using a secure protocol or the like). With the migration key $K_m$, the machine B 106 decrypts the secrets 108, if any, and may use them as desired.

In the above example, the migration key $K_m$ provides a TPM-like sealed secret 108, sealed only to the migration key $K_m$ (with the TPM-like device acting as a security processor). In this example, each unseal of a set of secrets 108 requires a communication with the key server 112, which is the holder of the migration key $K_m$ for that unseal.

The migration key $K_m$ for a given sealed secret may be unique to that secret. Each secret can be identified by a globally unique ID (e.g., a large random number or a sequence number assigned by the key server) and the key server can supply the migration key $K_m$ for that secret.

As can be readily appreciated and as described below, because there is provided a migrated TPM-like sealed secret, the secret may be sealed to the local TPM-like device or, for a virtual machine, to a virtual TPM-like device (V.TPM) via a storage key. The secret is prepared for migration by re-encrypting that secret in a session-like migration key $K_m$, such as for that particular migration. This encrypted blob is then sent to the destination TPM-like device, machine B 106 in this example, which engages in a protocol with the key server 112, authenticates to the server (by attestation), receives the blob's migration key $K_m$, decrypts the blob and re-encrypts the blob in the TPM-like device's $TPM_B$ which has its own storage key $K_{stor}$.

Alternatively, as also represented in FIG. 1, each communication with the key server 112 can set up a unique, fresh session key $K_{sess}$, whereby the key server 112 need never release the migration key $K_m$. Instead the key server 112 uses the migration key $K_m$ to decrypt the blob, and re-encrypts the secrets of the decrypted blob in the session key $K_{sess}$. The key server then provides $K_{sess}$ and the $K_{sess}$ re-encrypted secrets to the machine B 106. In this example, the migration key $K_m$ may remain the same for any secrets sealed by machine A 102.

Figure 2:
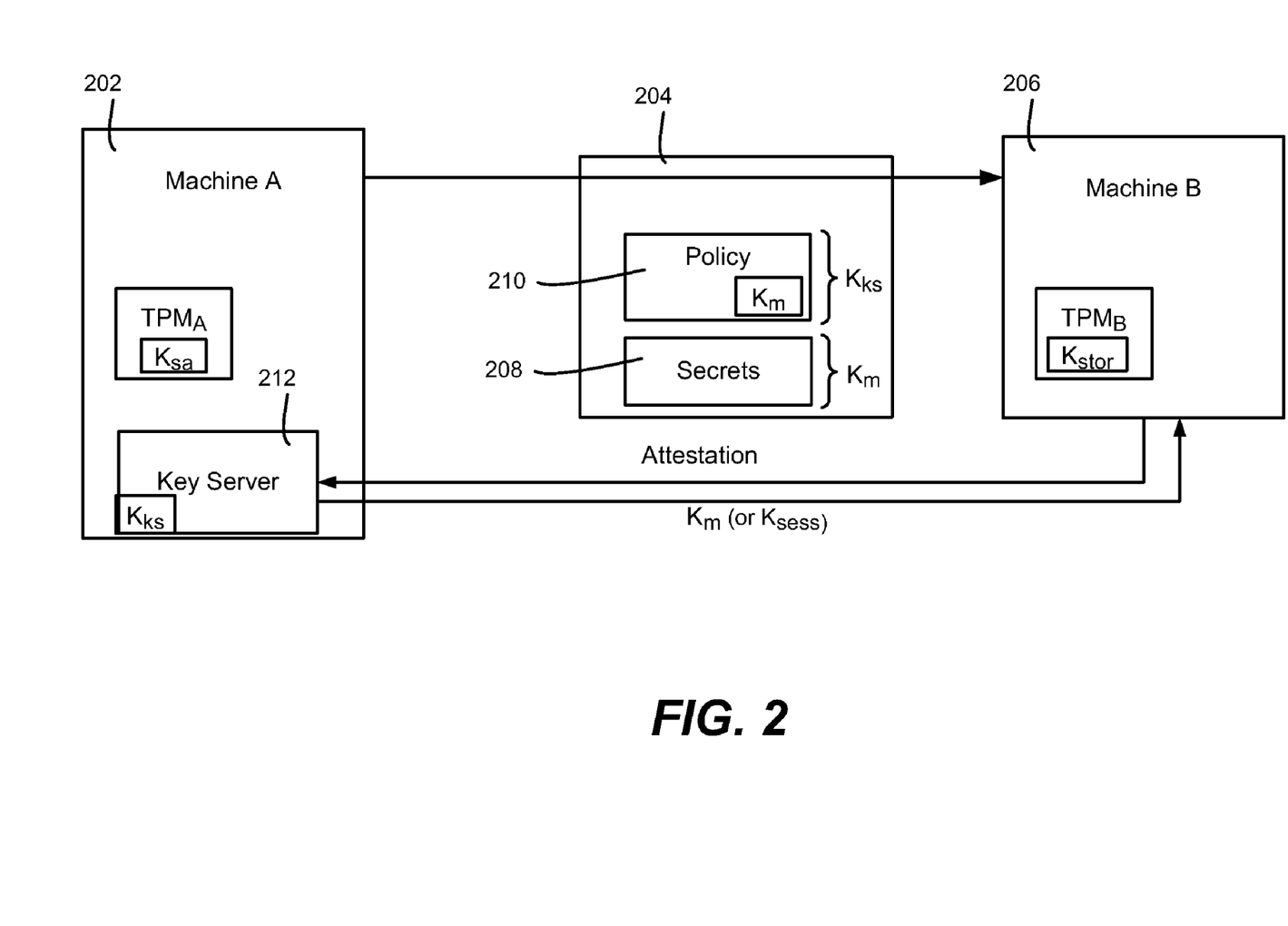
FIG. 2 is a block diagram representing an alternative example network configuration for migrating secrets between physical machines.

Another alternative is represented in FIG. 2, in which the source TPM-like device or some other protected environment within machine A incorporates a key server 212. Such a process may operate peer-to-peer eliminating the need for a separate key server as in FIG. 1.

As described above, there are access control decisions made during this process. For example, the source TPM-like device (e.g., machine A) needs to decide whether to allow a particular key server access to the secret it is protecting. This decision is made whether or not the protocol used allows the key server to handle the bits of the protected secret. From the point of view of cryptographic analysis, an attacker is assumed capable of copying and delivering those bits to the key server.

Once machine A allows the key server access, the key server makes an access control decision, deciding whether the destination TPM-like device (e.g., machine B) is authorized to receive the protected secret. When used only for migrating secrets from one platform to another, that may be the only decision made by the key server.

However, as indicated above there may be a larger set of policy decision criteria as to whether a set of secrets may be migrated. For example, when what is being migrated is a virtual machine, a policy may state that the same physical machine cannot allow one virtual machine (VM1) to coexist with another virtual machine (VM2). Thus a destination machine may have the credentials and boot configuration data to accept and run the virtual machine VM2, but does not meet the policy if it is currently running VM1, whereby migration is not allowed. Such criteria may be based on security requirements, business practices or anything else, however the security decision of whether to allow the destination TPM-like device to access a particular protected secret is one part of that larger decision.

With respect to attestation, each TPM-like device authenticates itself to a key server (e.g., the key server 112) using some cryptographic key in a protocol that proves possession of the key (typically by signing a message). The key server then uses one or more certificates to determine the nature of the destination TPM-like device (its strength of tamper-protection, for example) and possibly the nature of the protector of the physical computer within which the TPM-like device is housed, including the relationship of that protector to the owner or owners of the key service and of the data being protected. This certified set of relationships is what keeps a migrating protected secret or virtual machine with such a secret from migrating to a machine outside of the control of the owner of that secret or some delegate of that owner. The certificates used for proving those attributes (relationships, hardware characteristics, and so forth) may be of any format. Typically today certificates include X.509, SAML and XrML, but experimental formats such as SPKI/SDSI may be used, as well as formats that have not yet been developed. In a typical implementation these certificates are not verified to a commercial certificate authority (as is the common practice in X.509 certificate usage) but rather to a specific root controlled by the creator of the security policy being enforced. This is a well-known good practice, but not one often applied because it is commonly believed to introduce management and code complexity.

Note that in FIG. 2, the source TPM-like device incorporates the key server 212 and does not need to grant itself any special access. In other words, the machine A 202 including $TPM_A$ already has access to the secret in question. However, in its role as the key server 212, the security decision or decisions described above with respect to the machine B 206 is made.

Figure 3:
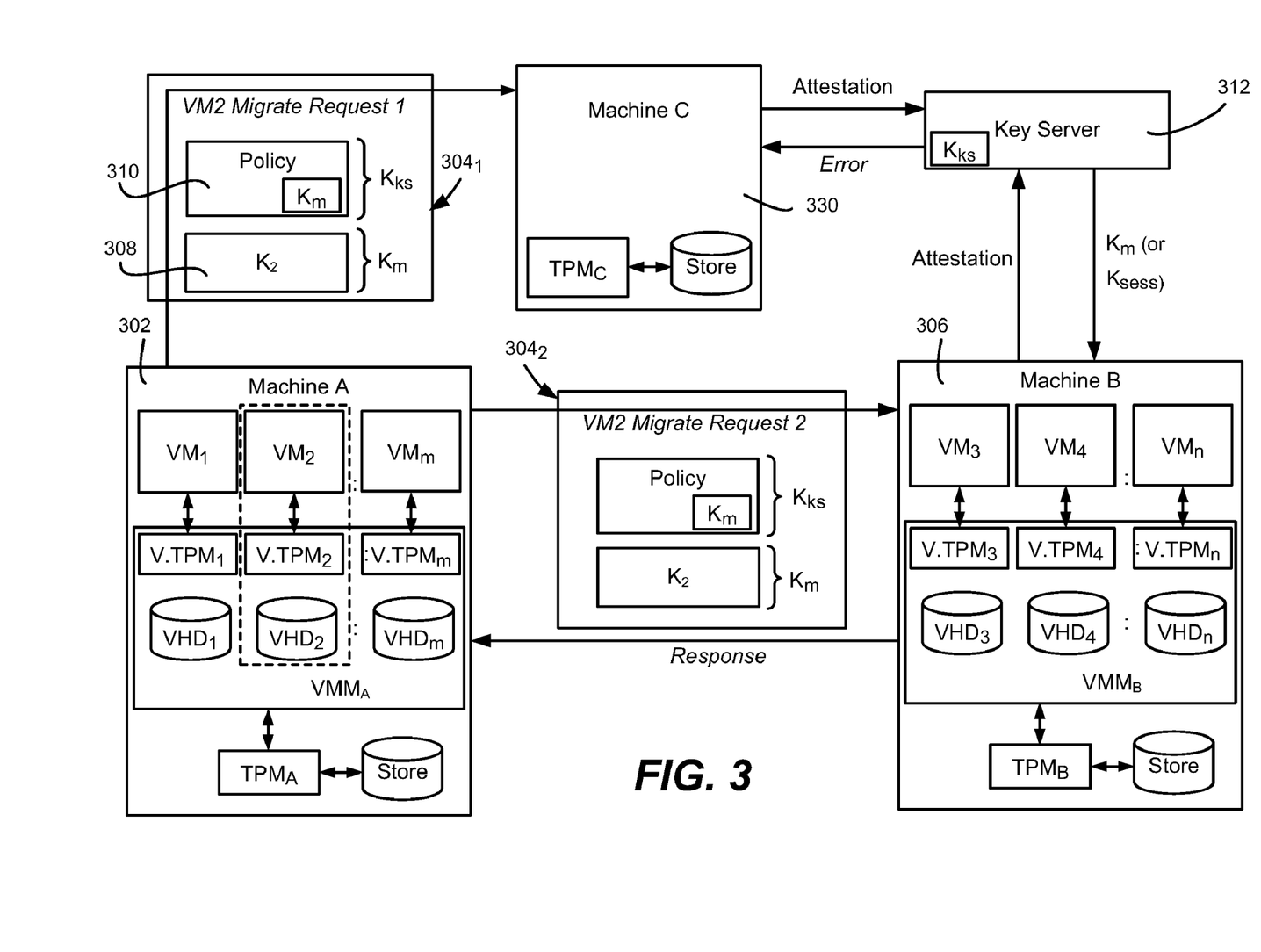
FIG. 3 is a block diagram representing an alternative example network configuration in which secrets are migrated only to appropriate physical machines.

By way of example of migration of a virtual machine, including appropriate secrets such as of the virtual TPM-like device, FIG. 3 shows a networking environment with a machine A 302, a machine B 306 and a machine C 330. Note that in the example of FIG. 3, the illustrated key server 312 is separate from the source machine A 302, but instead may be incorporated into the machine A as in the example of FIG. 2.

In this example, the machine A 302 is attempting to migrate a virtual machine VM$_2$ to another machine on the network. As part of this, a virtual machine manager (VMM$_A$) maintains the secrets for the virtual machine VM$_2$ in a virtual TPM-like device V.TPM$_2$, and also maintains a virtual hard drive VHD$_2$ for the virtual machine VM$_2$.

The secrets in V.TPM$_2$ are protected by a storage key, $K_2$, private to V.TPM$_2$. The secrets encrypted using $K_2$ are then normal data stored alongside other data in VHD$_2$. The secret to be migrated is therefore only $K_2$. The secrets protected by V.TPM$_2$ for example may include cryptographic keys, hash values and possibly an encryption key for portions of the virtual hard drive VHD$_2$. The machine A 302 seals the storage key $K_2$ 308 by encrypting with a migration key $K_m$. As described above, this migration key $K_m$ may be sealed within policy data 310, which is encrypted by a storage key $K_{ks}$ known to the key server 312.

In the example of FIG. 3, the machine C 330 receives the migration request blob and passes it to the key server 312 along with its attestation data. However, whether because of improper credentials, configuration and/or because machine C fails to meet the policy, the key server denies the request for the migration key (or a session key re-encrypted set of data). The failure to successfully migrate may be returned in some way to machine A 302, or may timeout, if for example machine C is a malicious machine that does not acknowledge the migration request failure.

Alternatively or at some other time, the machine A looks for another machine to which to migrate the virtual machine $VM_2$. In this example, this time the machine B 306 receives the migrate request/data blob $304_2$. In this example, the attestation data and policy compliance for the machine B are acceptable to the key server 312, and thus the machine B receives the migration key $K_m$ or a session key $K_{sess}$ by which the machine B can unseal the $V.TPM_2$ secrets, and use them to migrate the virtual machine VM2, including re-encrypting them using a $TPM_B$ storage key for use in a new instance of a virtual V.TPM2 on the machine B 306.

Figure 4:
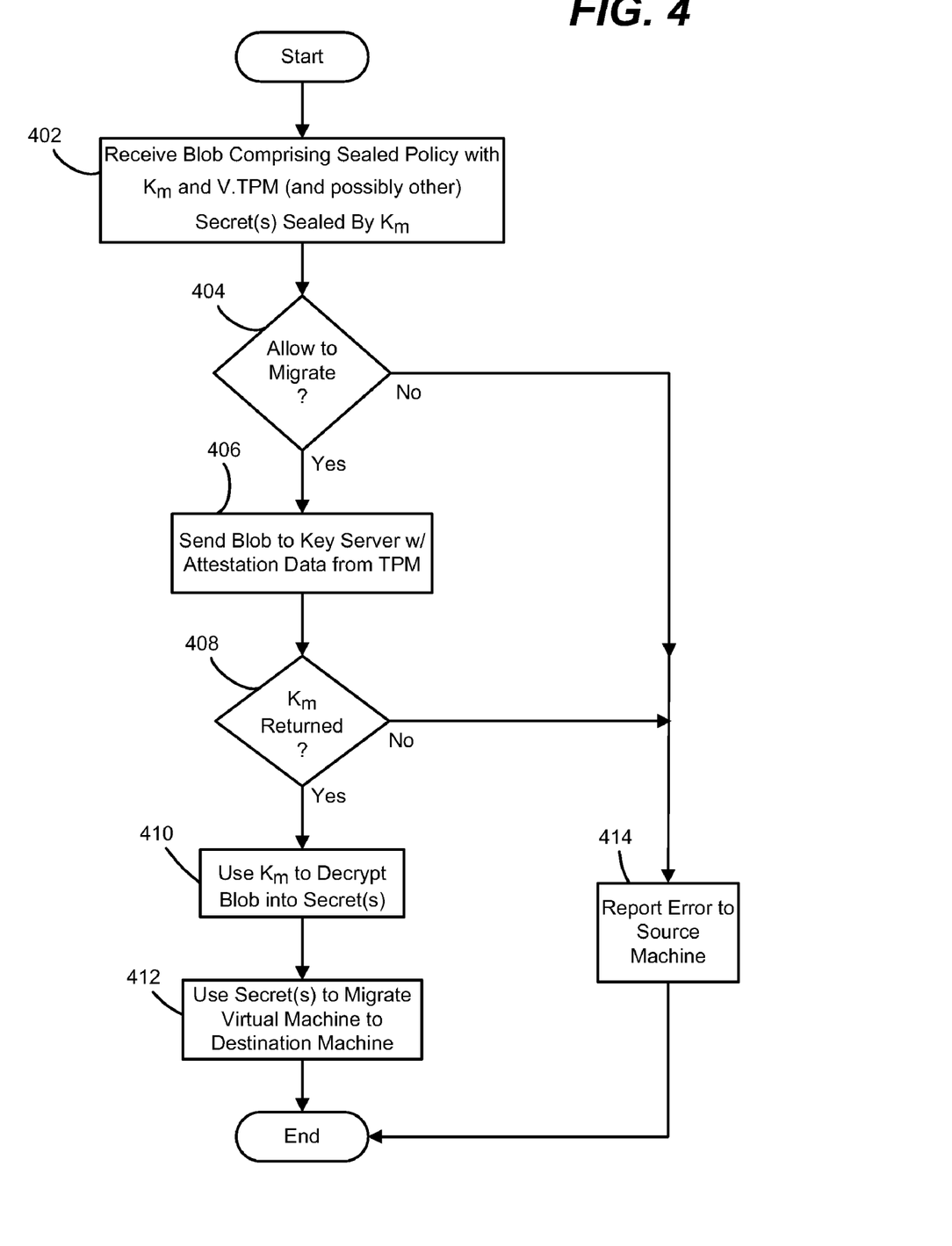
FIG. 4 is a flow diagram representing example logic taken by one machine to handle a virtual machine migration request from another machine.

FIG. 4 shows example logic that may be employed by a destination machine in handling a virtual machine migration request, including secrets from a virtual TPM-like device. Step 402 represents receiving the blob comprising the policy and the V.TPM secrets, and possibly other secrets. Step 404 evaluates whether the destination machine will allow the migration, which it may choose to not do for any of various reasons (e.g., too overloaded itself). Note that step 404 may be pre-negotiated between the source and destination machine, whereby migration is allowed subject to proper attestation and/or meeting other policy. Step 414 represents informing the source machine with a suitable error code or the like if migration is not allowed.

If instead the destination machine is willing to accept the migrated virtual machine, step 406 represents sending the blob to the key server, including any attestation data the destination machine needs to properly authenticate itself and pass configuration requirements, as well as pass other policy criteria. Note that this various information may be separately exchanged in more than one back-and-forth communication. Further note that only the policy need be sent in an environment in which the policy is separable by the destination from the secrets (e.g., two blobs) and the migration key is returned instead of a session key; the key server need not ever receive the secrets in such an environment.

Step 408 represents evaluating whether the key server has returned a migration key by which the secrets may be decrypted. Note that as described above, instead of a migration key, a session key may be returned in association with the secrets re-encrypted with that session key. In any event, if attestation requirements and policy compliance are met, step 410 is executed to decrypt the secrets, (otherwise an error is returned to the source at step 414 to inform the source of a migration failure). Step 412 represents the use of the secrets to finish the installation of the virtual machine on the destination (physical) machine and letting it run.

Figure 5:
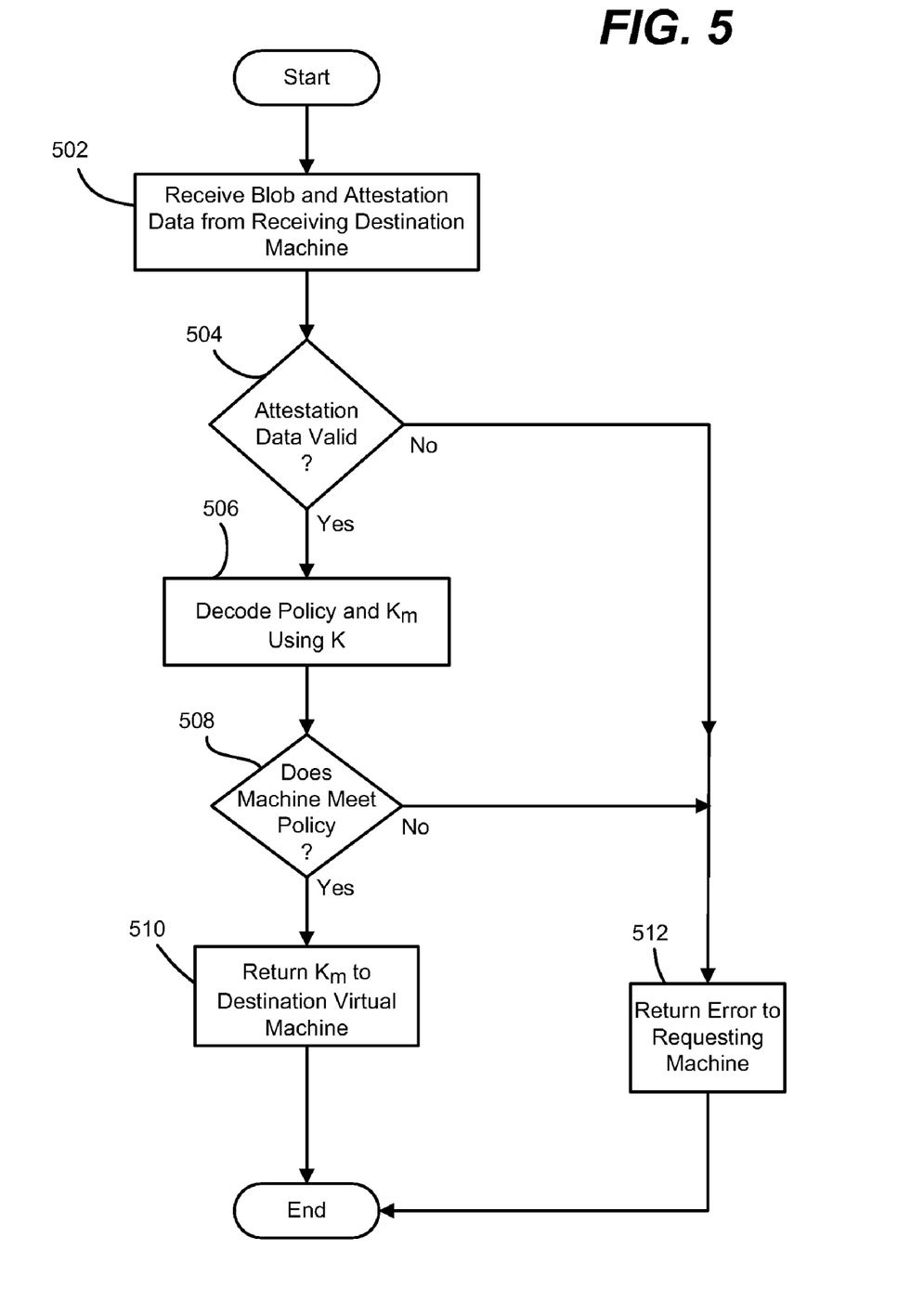
FIG. 5 is a flow diagram representing example logic taken by a key server to facilitate virtual machine migration.

FIG. 5 represents example logic that may be taken by a key server in determining whether to grant a requesting destination machine access to a key from which the secrets may be decrypted. Step 502 represents receiving the blob and attestation data and any other data from the (receiving) destination machine.

Step 504 evaluates the attestation data to determine if the destination machine is a valid machine entitled to receive the secrets from the source based on its credentials and possibly other configuration-related data, such as register values or a log indicative of boot code measurement. If not entitled to receive the secrets, step 504 branches to step 512 to return an error to the requesting machine. If so, step 504 branches to step 506.

Step 506 represents decoding the policy and the migration key using the storage key information known only to the source machine and the key server (which as described above may be the same machine). Public-private keys may be used, or the storage key may be known to both. Step 508 determines whether the destination machine meets other policy (if any) based on its current state. Note that as described above, additional communication between the destination machine and the key server may take place to exchange such information. If such policy is met, the migration key (or a session key with the session-key re-encrypted set of secrets) is returned to the destination machine at step 510, otherwise an error message is returned (step 512).

In this manner, secrets may be exchanged between two machines, with attestation data and policy evaluated to enforce that only appropriate machines can access the secrets.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium storing computer-executable instructions which, when executed, cause a computing machine to perform steps comprising:
   receiving, at a destination machine, a set of data from a source machine, the set of data including a sealed secret to be migrated from the source machine and a sealed policy for release of the sealed secret, the sealed secret sealed at the source machine with a migration key, the sealed policy sealed at the source machine with a cryptographic key that is known to a key server but not known to the destination machine, the sealed policy comprising the migration key;
   providing, by the destination machine, at least the sealed policy comprising the migration key to the key server;
   performing attestation with the key server to attest that the destination machine is entitled to access the sealed secret including at least providing attestation data indicative of boot code measurement of the destination machine for evaluation by the key server; and
   receiving, from the key server, a returned key that is used to access the sealed secret.

2. The computer-readable medium of claim 1 wherein the returned key received from the key server comprises the migration key that is used to unseal the sealed secret.

3. The computer-readable medium of claim 1 wherein the sealed secret is provided to the key server by the destination machine, the sealed secret is decrypted by the key server using the migration key and resealed by the key server using a session key, the returned key received from the key server comprises the session key that is used to unseal the resealed secret, the migration key is not released to the destination machine by the key server, and the steps further comprise receiving the resealed secret from the key server in association with the session key.

4. The computer-readable medium of claim 1 wherein the migration key is provided to the source machine by the key server.

5. The computer-readable medium of claim 1 wherein performing attestation with the key server includes signing the data indicative of boot code measurement with a private key at the destination machine.

6. The computer-readable medium of claim 1 wherein the steps further comprise:

using, at the destination machine, the returned key to unseal a sealed secret that corresponds to a virtual trusted platform module on the source machine; and using, at the destination machine, the unsealed secret that corresponds to the virtual trusted platform module on the source machine to migrate a virtual machine from the source machine to the destination machine.

7. The computer-readable medium of claim 1 wherein the set of data comprises one or more secrets protected by a private storage key of a trusted platform module device on the source machine, and wherein the sealed secret comprises the private storage key of the trusted platform module device on the source machine.

8. The computer-readable medium of claim 1 wherein the sealed policy comprising the migration key further comprises policy data to be evaluated by the key server against a current state of the destination machine.

9. The computer-readable medium of claim 8 wherein the steps further comprise:

providing state data to the key server indicative of the current state of the destination machine for evaluation by the key server against the policy data.

10. In a computing environment, a system comprising a source machine including a trusted platform module device, the source machine configured to:

seal a secret to be migrated from the source machine to a destination machine, the secret sealed with a migration key different from a storage key that is private to the trusted platform module device;

seal the migration key and a policy for release of the sealed secret, the migration key and the policy sealed with a cryptographic key that is known to a key server but not known to the destination machine; and send a data set including the sealed secret, the sealed migration key, and the sealed policy to the destination machine for unsealing of the sealed secret by the destination machine via interaction with the key server, the destination machine configured to provide attestation data indicative of a measured software configuration of the destination machine for evaluation by the key server, the key server configured to unseal the sealed migration key, unseal the sealed policy, evaluate validity of the destination machine based on the measured software configuration and the unsealed policy, and return data to the destination machine for unsealing the sealed secret if the unsealed policy is satisfied by the destination machine.

11. The system of claim 10 wherein the key server is incorporated into the source machine.

12. The system of claim 10 wherein the key server is independent of the source machine.

13. The system of claim 10 wherein the data returned by the key server to the destination machine includes the unsealed migration key.

14. The system of claim 10 wherein the key server is further configured to receive the sealed secret from the destination machine, unseal the sealed secret using the unsealed migration key, reseal the unsealed secret using a session key, and return the resealed secret and the session key to the destination machine.

15. The system of claim 10 wherein:

the attestation data indicative of a measured software configuration of the destination machine includes register values indicative of the destination machine's configuration measured in a boot process, and;

the destination machine performs attestation with the key server by signing the register values with a private key at the destination machine that corresponds to a trusted platform module device on the destination machine.

16. In a computing environment, a method comprising:

receiving, at a key server, a set of data provided by a destination machine, the set of data including a sealed policy for release of a sealed secret received by the destination machine from a source machine, the sealed policy sealed at the source machine with a cryptographic key that is known to the key server but not known to the destination machine, the sealed policy comprising a migration key used by the source machine to seal the sealed secret received by the destination machine from the source machine;

unsealing the sealed policy comprising the migration key at the key server;

receiving attestation data from the destination machine including boot-related data for the destination machine;

determining from the attestation data that the destination machine satisfies the unsealed policy, is in a known good configuration, and is entitled to unseal the sealed secret received by the destination machine from the source machine; and providing a return key from the key server to the destination machine that allows the destination machine to access the sealed secret.

17. The method of claim 16 further comprising:

evaluating the unsealed policy against a public key certificate of the destination machine included in the attestation data.

18. The method of claim 16 further comprising:

evaluating the unsealed policy against state data indicative of a current state of the destination machine included in the attestation data.

19. The method of claim 16 further comprising:

receiving, at the key server from the destination machine, the sealed secret received by the destination machine from the source machine as part of the set of data provided by the destination machine;

using the migration key at the key server to unseal the sealed secret;

resealing the unsealed secret at the key server with a session key; and providing the session key and the resealed secret from the key server to the destination machine.

* * * * *